United States Patent [19]

Parker et al.

[11] Patent Number: 5,240,661
[45] Date of Patent: Aug. 31, 1993

[54] FABRICATION PROCESS FOR COMPOSITE SWASHPLATE

[75] Inventors: David J. Parker, Newtown; Dean Nguyen, Stamford, both of Conn.

[73] Assignee: United Technlogies Corp., East Hartford, Conn.

[21] Appl. No.: 830,484

[22] Filed: Feb. 4, 1992

Related U.S. Application Data

[63] Continuation of Ser. No. 516,911, Apr. 24, 1990, abandoned.

[51] Int. Cl.$^5$ .......................... B29D 28/00; B28B 7/32
[52] U.S. Cl. .................................... 264/103; 156/172; 264/257; 264/275; 264/314; 416/134 A
[58] Field of Search ............... 264/101, 102, 135, 136, 264/137, 257, 258, 275, 276, 277, 278, 279, 279.1, 103, 314, 317, 313; 156/172, 173, 175, 184, 187; 416/134 A

[56] References Cited

U.S. PATENT DOCUMENTS

| | | | |
|---|---|---|---|
| 2,739,350 | 3/1956 | Lampman | 156/173 |
| 3,282,757 | 11/1966 | Brussee | 156/172 |
| 3,966,523 | 6/1976 | Jakobsen et al. | 264/258 |
| 4,124,678 | 11/1978 | Stroupe | 264/314 |
| 4,483,214 | 11/1984 | Mayer | 264/257 |
| 4,540,536 | 9/1985 | Altmann et al. | 264/258 |
| 4,657,717 | 4/1987 | Cattanach et al. | 264/314 |
| 4,762,740 | 8/1988 | Johnson et al. | 264/263 |
| 4,804,315 | 2/1989 | Ferris et al. | 416/134 A |
| 4,849,150 | 7/1989 | Kittaka | 264/258 |
| 4,876,050 | 10/1989 | Horton | 264/258 |
| 5,061,418 | 10/1991 | Ware | 264/257 |
| 5,080,850 | 1/1992 | Holloway | 156/156 |

Primary Examiner—Jay H. Woo
Assistant Examiner—Robert B. Davis
Attorney, Agent, or Firm—McAulay Fisher Nissen Goldberg & Kiel

[57] ABSTRACT

A method for fabricating a composite swashplate ring utilizing a thermoplastic expandable mandrel which is rigid during braiding, yet softens after resin impregnation to allow expansion in a mold to increase fiber consolidation. Preferably, the mandrel accepts the incorporation of preformed structures prior to braiding with the braided mandrel suitable for incorporation in a resin transfer mold such that a dry fiber braided article having preformed structures may be impregnated with resin and consolidated to produce a net-shaped composite swashplate ring without machining.

17 Claims, 3 Drawing Sheets

5,240,661

FABRICATION PROCESS FOR COMPOSITE SWASHPLATE

This is a continuation of application Ser. No. 07/516,611, filed Apr. 24, 1990, now abandoned.

TECHNICAL FIELD

This invention relates to methods for fabricating net-shaped composite parts.

BACKGROUND

Typically, a helicopter swashplate has an inner swashplate-ring and an outer swashplate ring concentric with the inner ring. The rings are separated by bearings which accommodate relative rotation between the rings. Typically, the rings are made from a machined aluminum casting which is of considerable weight and requires labor intensive machining operations. Also, aluminum is susceptible to ballistic damage.

DISCLOSURE OF THE INVENTION

It is an object of the present invention to provide a method for fabricating hollow articles which are near net-shaped.

It is another object to provide a method for producing composite swashplate rings which provides a near net-shaped ring which does not require machining.

It is a further object to provide a method for producing a composite swashplate ring utilizing a resin transfer molding process.

It is another object to provide a method for fabricating a net-shaped composite swashplate ring utilizing an internally pressurizable mandrel which has means for accommodating preformed fittings.

It is a further object to provide a method for producing a composite swashplate ring utilizing a braided or filament wound construction.

These and other objects of the present invention are achieved by providing a fabrication process comprising the steps of providing an expandible thermoplastic mandrel, the mandrel being a continuous hollow ring structure having a uniform thickness, preferably produced by rotational molding. The mandrel is made of a material which is essentially rigid at room temperature, yet softens at higher temperatures allowing expansion of the mandrel. Preformed fittings may be attached to the ring mandrel using resin as a tackifier. Fibers are then braided or wound around the mandrel, preferably with the mandrel braided with graphite fiber roving. The braided assembly is then disposed in a mold cavity and resin is injected. The mold is heated and a gas is injected into the mandrel to expand the mandrel and compress the laminate, increasing consolidation.

BRIEF DESCRIPTION OF THE DRAWINGS

FIG. 1b is a side view of FIG. 1a.

DETAILED DESCRIPTION OF THE DRAWINGS

Figure 1A:
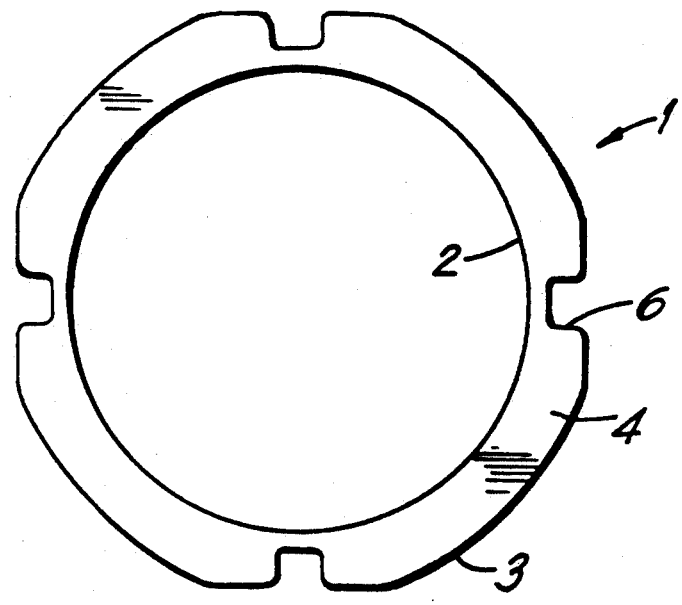
FIG. 1a is a top view of a thermoplastic mandrel for molding a composite swashplate ring.
Figure 1B:
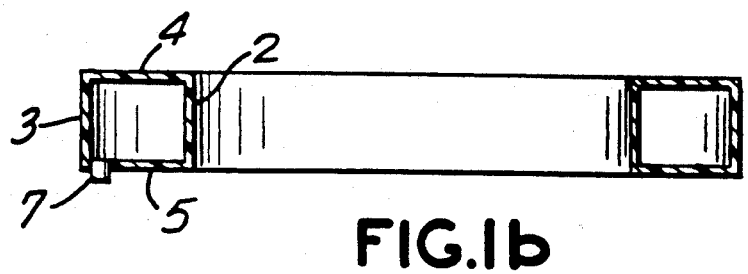

Referring to FIGS. 1a and 1b, a thermoplastic mandrel 1 for producing a net-shaped composite swashplate ring is shown. The mandrel 1 is essentially a hollow ring having an inner wall 2 and an outer wall 3, top 4 and bottom 5. The outer wall 3 is shaped to have fitting receptacles 6. The wall thickness will vary with the choice of material and desired expansion with the mandrel 1 having a wall thickness of about ⅛th inch. The ring also has a tap 7 through which a gas may enter and pressurize the mandrel.

The ring is formed of a thermoplastic material which is rigid at room temperature. Preferable materials are polypropylene and polyethylene, but other thermoplastic materials may also be used. The mandrel is preferably formed by rotational molding, which involves placing a powdered thermoplastic material in a mold and rotating the mold in various directions while heating to melt and evenly distribute the material over the mold surfaces. The slow rotation of the entire mold creates a uniform coating on the inside of the cavity, as the centrifical forces insure the uniform distribution of the material which is important to obtaining a uniform wall thickness.

While the process of the present invention can be used to produce any fiber wound or braided hollow structure, the process has particular applicability to producing the stationary and rotating rings of a helicopter swashplate, and thus the production of such parts will be hereinafter described. However, the invention is not limited to producing such products.

The rotating and stationery rings of a swashplate are preferably fabricated using a bi- or triaxial braiding process and resin transfer molding. The process of braiding comprises applying multiple tows of dry fiber over the mandrel, typically using a braiding machine. Because the swashplate rings are continuous, a split ring braiding machine may be used which allows opening the braiding ring for installation of the mandrel. The braiding ring is then closed and rotated around the mandrel, applying the fiber tows to form a braided toroidal shell. Control of the fiber angle is maintained by controlling the translational speed of the braiding ring. Dry fibers such as graphite, glass or polyaramid, among others, may be used for braiding, with graphite fibers preferred. Either a bi- or triaxial braid may be used. Where a triaxial braid is used, the third fiber is oriented to lock the other fibers in place and is circumfrentially oriented to react to bending loads on the rings.

Figure 2:
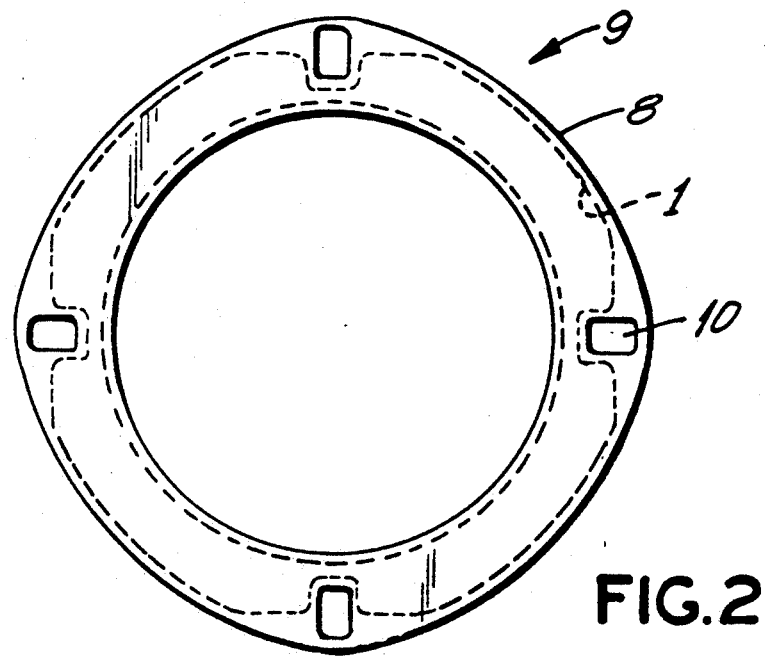
FIG. 2 is an illustrative view of the mandrel after braiding.

Referring to FIG. 2, the mandrel 1, shown in phantom, has a braided fiber 8 disposed thereover to form as assembly 9. Preformed fittings 10 are incorporated in the assembly prior to braiding.

Four graphite preforms are provided in the assembly 9. These are attached to the mandrel, prior to braiding, using a small amount of resin as a tackifier. These form lug attachments for actuator links. Pultruded graphite stanchions may also be bonded into the receptacles on the outer diameter of the mandrel. All details are held in place by the braid which forms the outer skin.

Figure 3:
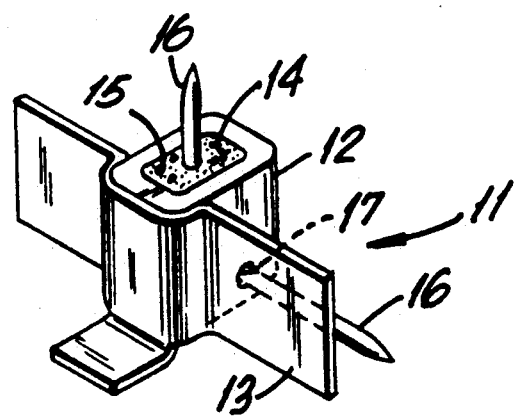
FIG. 3 is a preformed lug insert for incorporation with the mandrel.

Referring to FIG. 3, a preformed lug fitting assembly 11 is shown. A fitting 12 is provided which may be molded filament wound, prepared by hand layup or fabricated from metal. A strip of dry fiber 13 is used to tack the fitting to the mandrel. Since the fitting 12 has a cavity 14, the cavity 14 is filled with foam 15 to prevent resin intrusion during molding. Pins 16 are placed in bolt holes 17 for the same purpose.

After braiding, the braid must be impregnated with resin. Typical resin impregnation techniques include pre-impregnating the braid prior to winding, impregnating each layer with resin as it is applied or utilizing resin transfer molding. The use of pre-impregnated material produces problems due to the pressure required to consolidate the material and the potential for moisture degradation of the uncured pre-impregnation. Layered impregnation does not provide precise control of the resin content and increases the likelihood of porosity in the finished part. However, resin transfer molding allows precise control of the resin content and final part contour allowing finished production of net-shaped parts. Also, since the resin is not applied until the part is completely wound, dry cloth reinforcements or preformed fittings may be applied to the structure prior to resin impregnation. The fittings, which may comprise the attachments for control rods, are preferably incorporated internally as part of the mandrel before braiding.

Figure 4:
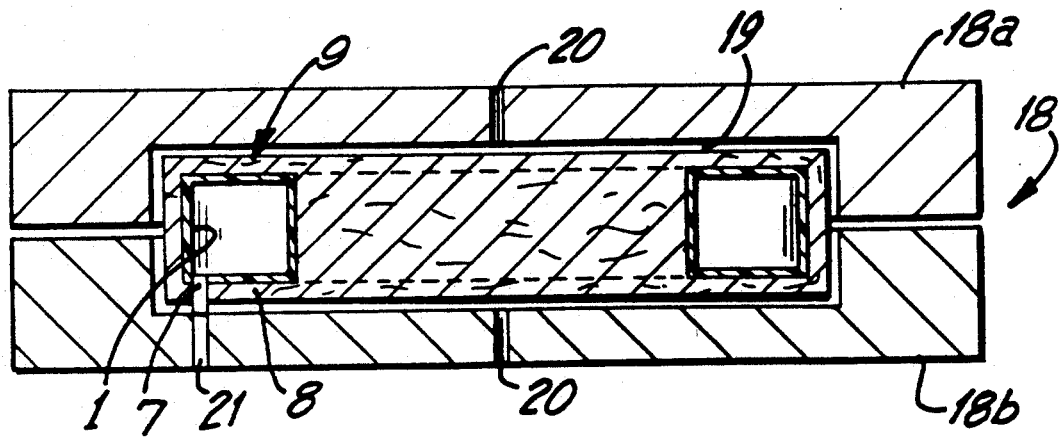
FIG. 4 is a cross sectional view of the wound assembly disposed in a mold.

Referring to FIG. 4, the assembly 9 is placed in a split metal mold 18 with the mold halves 18a and 18b defining a mold cavity 19. The mold has resin inlets 20 and a gas inlet 21 connectable to tap 7 on the mandrel 1. Before placement in the mold, the braid is displaced from the mandrel tap for connection to the fitting incorporated in the mold.

Figure 5:
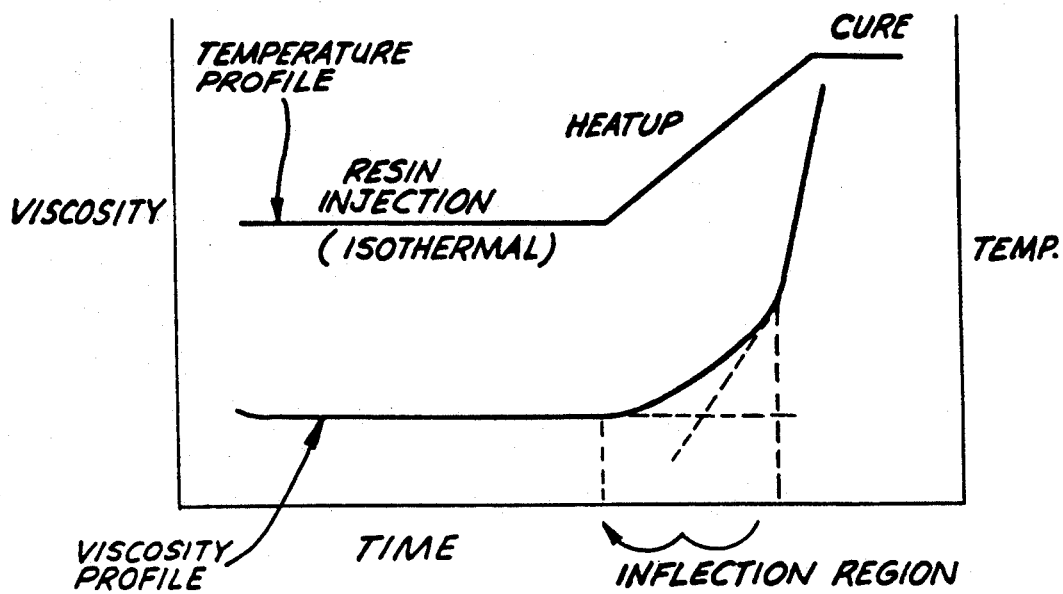
FIG. 5 is a graph showing the change in resin viscosity with temperature.

The mold 18 is then closed and resin injected. Heat is applied which assists in removing air from the braid. When the resin reaches a temperature of about 150–400° F., the mandrel becomes sufficiently soft to allow expansion and the mandrel is pressurized by a gas, preferably air to a pressure which causes expansion of the mandrel and consolidation of the resin impregnated fiber. Generally a pressure of about 5-20 psi is sufficient, but this may vary with the application. This pressure forces the braid and resin against the hard mold surfaces, increasing consolidation of the assembly. Without such a pressurizable mandrel, fiber volume would be on the order of about 35–40%. With such a mandrel, fiber volume increases to 50–60%, a significant improvement which increases the strength of the ring. Since the mandrel has a uniform thickness, assured by using rotational molding, uniform pressure is applied across the mandrel surface assuring uniform consolidation. Preferably, the thermoplastic material is chosen to have a softening point which coincides with the inflection region where the resin undergoes a change in viscosity, as illustrated in FIG. 5. This assures optimum consolidation. For example, polypropylene has a softening region of about 150–180° F. which coincides with the inflection region of epoxy resin.

Figure 6:
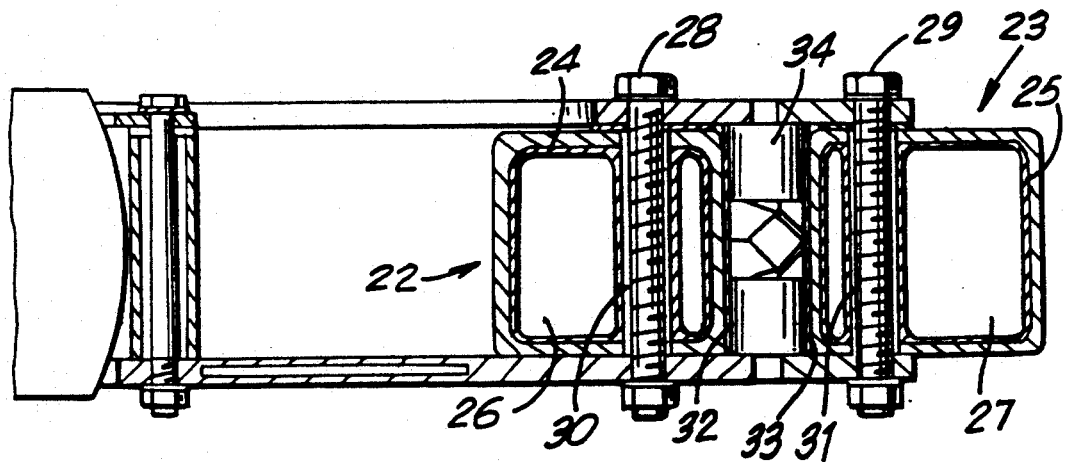
FIG. 6 is an illustrative view of a finished composite swashplate.

Referring to FIG. 6, a pair of composite swashplate rings 22 and 23 are shown. The rings have mandrels 24 and 25 incorporated therein defining cavities 26 and 27. Since the rings are continuous, the mandrels become part of the finished products. Of course, this need not always be the case, depending on the article configuration. Bolts 28 and 29 extend through fittings 30 and 31. A pair of metal liners 32 and 33 are bonded to the facing surfaces of the rings to provide a liner for a duplex bearing 34 separating the inner and outer rings.

In another embodiment, the mandrel is covered with braids to about one-half of the final thickness. Each pushrod attachment point, comprised of three graphite preforms surrounding foam cores, is then attached to the partially braided mandrel. The three segments are separated from one another by a thin foam sheet. This minimizes acoustic coupling and improves survivability after ballistic impact. Each segment is, however, in intimate contact with the braided ring, with the completed mandrel assembly then braided with the remaining thickness fiber. The assembly is then impregnated with resin using the resin transfer molding process previously described, the assembly is cured and the facing surface bonded with a metallic liner for the duplex bearings. Slots may be machined in the outer wall of the rotating ring to permit installation of other components such as scissors assemblies, or the drilling for bolt holes.

Utilizing a pressurizable mandrel increases the strength of the finished part by allowing increased consolidation in a mold. By producing the mandrel using a rotomolding process, uniform expansion with uniform consolidation is achieved. By providing a mandrel which is rigid at room temperature, mechanical strength during braiding is assured, yet, upon heating, the mandrel soften sufficiently to allow expansion and consolidation.

While a process for producing a ring for a swashplate is disclosed, it will be understood that any hollow structure using braided or filament wound dry fiber could be made according to the present invention and variations in the products made or braiding process, do not vary from the present invention.

We claim:

1. A method for fabricating a hollow composite article consisting essentially of:
    preparing a hollow mandrel having uniform thickness walls, the mandrel having a shape approximating the shape of the hollow portion of the composite article, the mandrel made from a thermoplastic material having sufficient rigidity at room temperature for applying one or more fibers thereover, the material being softenable at an elevated temperature for expanding the mandrel upon pressurization;
    applying one or more fibers over the mandrel;
    placing the mandrel with fibers thereof in a mold;
    injecting resin into the mold for infiltration between the fibers;
    heating the mold, the resin and the mandrel contained therein to a temperature at which the resin begins to cure and the resin viscosity begins to increase, and at which temperature the mandrel is softened,
    pressurizing the softened mandrel at the temperature where resin viscosity begins to increase and the mandrel is softened to expand the mandrel, the pressure exerted on the mandrel having uniform thickness walls producing uniform expansion of the mandrel for uniformally consolidating substantially all the resin infiltrated fibers,
    heating the mold, the resin and the mandrel contained therein to a curing temperature, and,
    curing to form a hollow composite article.

2. The method of claim 1, further comprising tacking inserts to the mandrel prior to applying the fiber.

3. The method of claim 1, further comprising tacking inserts to the mandrel after a portion of the fiber has been applied and then applying the remaining portion of fibers over the mandrel and inserts.

4. A method for fabricating a hollow composite swashplate ring consisting essentially of;

preparing a hollow mandrel having uniform thickness walls from a thermoplastic material, the mandrel having a shape corresponding approximately to a shape of the hollow portions of the composite swashplate ring, the mandrel being made from a thermoplastic material having sufficient rigidity at room temperature for applying one or more fibers thereover, the material being softenable at an elevated temperature for expanding the mandrel upon pressurization;

applying one or more fibers over the mandrel; placing the mandrel with fibers thereover in a mold; injecting resin into the mold for infiltration between the fibers;

heating the mold, the resin and the mandrel contained therein to a temperature at which the resin begins to cure and the resin viscosity begins to increase, and at which temperature the mandrel is softened, pressurizing the softened mandrel at the temperature where resin viscosity begins to increase and the mandrel is softened to expand the mandrel, the pressure exerted on the mandrel having uniform thickness walls producing uniform expansion of the mandrel for uniformally consolidating substantially all the resin infiltrated fibers heating the mold, the resin and the mandrel, contained therein to a curing temperature, and, curing to form the hollow composite swashplate ring.

5. The method of claim 4, wherein the dry fiber is braided over the mandrel.

6. The method of claim 5 wherein the braid is a bi-or triaxial weave.

7. The method of claim 4, wherein the fiber is filament wound over the mandrel.

8. The method of claim 1, wherein the fiber is selected from the group consisting of graphite, glass and polyaramid.

9. The method of claim 4, wherein the fiber is selected from the group consisting of graphite, glass and polyaramid.

10. The method of claim 1, wherein the mandrel is made of polyethylene.

11. The method of claim 4, wherein the mandrel is made of polyethylene.

12. The method of claim 1, wherein the mandrel is made of polypropylene.

13. The method of claim 4, wherein the mandrel is made of polypropylene.

14. The method of claim 1, wherein the mandrel is prepared by rotational molding.

15. The method of claim 4, wherein the mandrel is prepared by rotational molding.

16. The method of claim 1, wherein the mandrel is pressurized to about 20 psi.

17. The method of claim 4, wherein the mandrel is pressurized to about 20 psi.

* * * * *